United States Patent [19]

Navaro et al.

[11] 4,160,717
[45] Jul. 10, 1979

[54] ELECTRIC CONTACT POST FOR ELECTROCHEMICAL MACHINE

[75] Inventors: Gérard Navaro, Cleon Sud; Jean-Pierre Maillard, Fontenay aux Roses; Serge Lacroix, Saint Gratien, all of France

[73] Assignee: Regie Nationale des Usines Renault, Boulogne-Billancourt, France

[21] Appl. No.: 882,325

[22] Filed: Mar. 1, 1978

[30] Foreign Application Priority Data

Mar. 2, 1977 [FR] France ............... 77 06046

[51] Int. Cl.² ................. C25F 7/00; B23P 1/02
[52] U.S. Cl. ................. 204/279; 204/224 M; 204/297 R
[58] Field of Search ............ 204/279, 297 R, 224 M, 204/224 R

[56] References Cited

U.S. PATENT DOCUMENTS

| 2,498,129 | 2/1950 | Lindsay | 204/224 R |
|---|---|---|---|
| 3,547,797 | 12/1970 | Haggerty | 204/224 M |
| 3,658,684 | 4/1972 | Sickels | 204/244 M X |
| 3,664,947 | 5/1972 | Bass | 204/224 M X |
| 4,116,799 | 9/1978 | Gosger et al. | 204/224 M |

FOREIGN PATENT DOCUMENTS 2246774  4/1974  Fed. Rep. of Germany ........... 204/224

Primary Examiner—John H. Mack
Assistant Examiner—D. R. Valentine
Attorney, Agent, or Firm—Oblon, Fisher, Spivak, McClelland & Maier

[57] ABSTRACT

An electric contact post resistant to heating at the contact in electrochemical machining operations. The post tip, of heat-resistant alloy, slides partially in a sleeve of metallic alloy resistant to heat and corrosion, held in the corresponding post of the post guide hole made in a support of insulating material.

5 Claims, 1 Drawing Figure

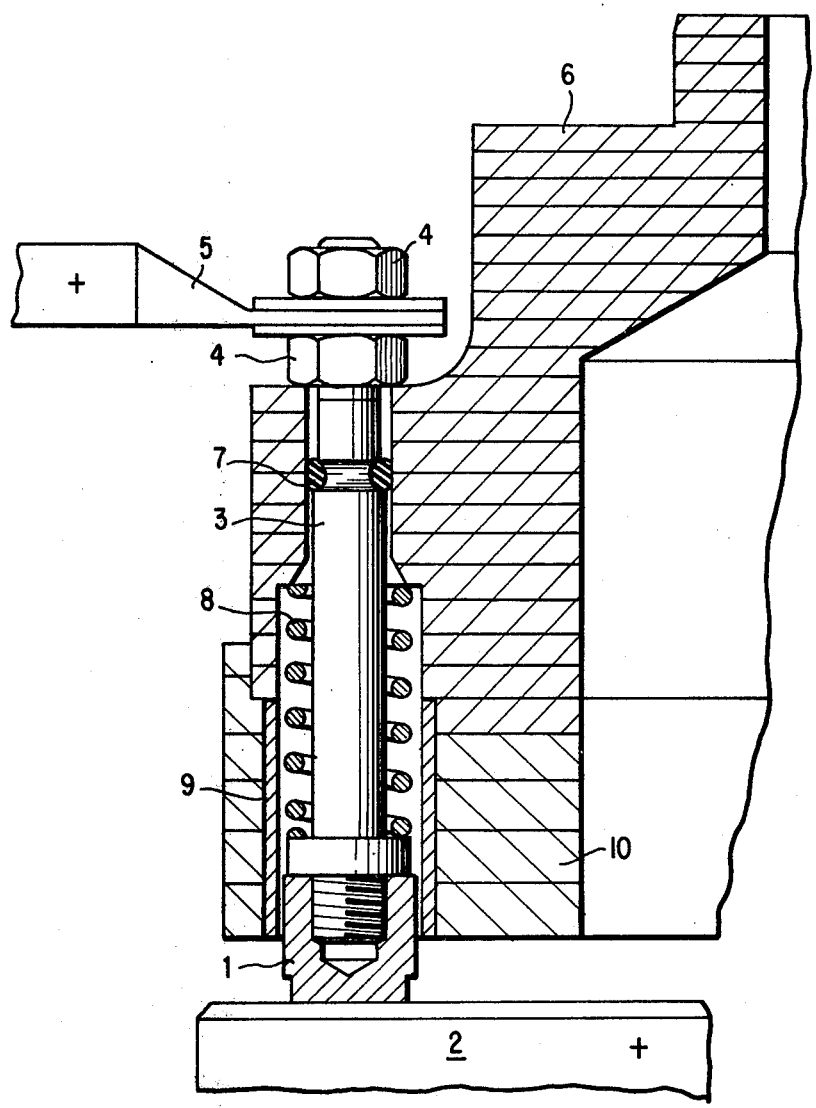

ELECTRIC CONTACT POST FOR ELECTROCHEMICAL MACHINE

BACKGROUND OF THE INVENTION

The present invention relates to electric-contact posts for electrochemical machining tools.

These contacts, both on the electrode tools and the workpieces, pass high-intensity electric currents and the contact-resistance may be the source of considerable heating leading to destruction of the post and damage of the tool.

It has been attempted to limit such risks by reducing contact resistance to a minimum, notably by coating the contact surfaces of the post with a high-conductivity metal, such as silver, deposited electrolytically.

If these solutions improve the electrical contacts, they do not prevent accidental resistance which can arise because of impurities at the contact or poor condition of the workpiece surface reducing the area of contact.

SUMMARY OF THE INVENTION

Accordingly, one object of this invention is to provide a novel post constructed so as to make its heating supportable by the tool without alteration in its conditions of operation.

The objects of the invention are achieved by an electric-contact post comprising a contact tip screwed on a rod, generally of copper and at the end of which is fastened the terminal lug of the conductors supplying the current, for example by clamping it between two nuts screwed onto the other threaded end of the post-holding rod. This rod slides in a hole through a support of insulating material in which is disposed a spiral spring concentric with the rod and intended to provide the contact pressure of the post on the workpiece surface which the electric current must traverse. According to the invention, the wall of the hole through the insulating support is reinforced in the zone where the tip slides by a sleeve of an alloy resistant to corrosion and the heating of the post tip. This sleeve is advantageously mounted in a removable nonconducting piece, itself attached to the post-holder, the contact area of the two pieces limiting the diffusion of heat from one to the other. In case of overheating, only the removable piece will be destroyed and need replacing. Moreover, its destruction cannot cause jamming of the post, which will remain free to slide in its metal sleeve. In extreme cases, overheating of the spring will necessitate its replacement, but in any case, operation will not be interrupted by jamming of the contact tip and can be continued until the end of the machining in progress. For better resistance to heating, the tips will advantageously be made of a tungsten-base fitted alloy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The FIGURE shows one embodiment of the post of the invention.

DESCRIPTION OF THE PREFERRED EMBODIMENT

Referring now to the sole FIGURE in the drawing, the post tip 1, resting on a workpiece 2 being machined, is fixed to a current-conducting guide rod 3, generally of copper. The other end of this rod is threaded and two nuts 4, clamping a terminal 5 of the conductor supplying electrical current, are screwed thereon.

The rod 3 slides in a hole formed in a support 6 of nonconducting material, such as the plastic known commercially under the name NORYL. An O-ring 7 permits the rod 3 to slide without play in its hole, while avoiding any risk of jamming due to expansion, a large play being maintainable between the rod and the hole wall.

The arrangement likewise has the advantage of avoiding all direct contact between the heated rod 3 and the support 6.

A spring 8 assures maintaining contact of the post tip 1 with the workpiece 2. The tip 1 slides, likewise with enough play, in a metallic sleeve 9 held in the portion of the guide hole corresponding to the zone in which the post tip slides. The sleeve 9 can be contained in a piece 10 attached to the support 6, corresponding to the zone liable to be affected by overheating.

In this case, the sleeve 9, which preferably is made from a titanium alloy because of its resistance to heat and corrosion, will protect the tip 1 against any jamming due to possible deformation of the sides of the hole in piece 10.

The tip 1, preferably made of tungsten alloy, will likewise resist overheating to which it is subjected. Expensive coating of the contact surfaces is therefore no longer necessary. The assembly functions under all conditions of heating, even extreme, existing in electrochemical machining operations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an electrochemical tool for machining a workpiece, an electric contact post comprising:
    a support of nonconducting material having a through hole;
    a current conducting guide rod slidable without play in said hole of said support;
    a sleeve of heat and corrosion resistant material disposed in one end of said hole of said support;
    a tip fixed to one end of said guide rod and slidable with sufficient play to avoid jamming in said sleeve; and
    a spring arranged to press said tip against said workpiece.

2. The electrical contact post recited in claim 1 wherein said tip is made of tungsten alloy resistant to heating.

3. The electrical contact post recited in claim 1 wherein said sleeve is made of a titanium alloy.

4. The electrical contact post recited in claim 1 including:
    an insulating member attached to said support, and wherein said sleeve is held in said insulating member.

5. The electrical contact post recited in claim 4 including:
    an O-ring disposed in said hole of said support, whereby said guide rod is centered therein without play.

* * * * *